United States Patent Office — 2,712,031 — Patented June 28, 1955

2,712,031

MONOSUBSTITUTED SALICYLALDEHYDE ALKOXIMES

Max N. Huffman, Oklahoma City, Okla., assignor to Lasdon Foundation, Inc., Yonkers, N. Y., a corporation of New York No Drawing. Application October 27, 1953, Serial No. 388,675

8 Claims. (Cl. 260—562)

This invention relates to certain novel alkoxime compounds and relates more particularly to certain substituted alkoximes of salicylaldehyde. These compounds, especially in the alpha-isomeric form, have valuable fungicidal and fungistatic properties, and are valuable when applied topically against fungi such as *Candida albicans, Tricophyton mentagrophytes, Blastomyces dermatitis, Histoplasma capsulatum* and *Nocardia asteroides,* and are effective as fungicides in dilutions as low as one part per million.

The compounds of my invention may be represented by the following formula:

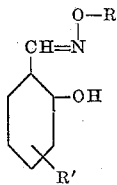

wherein R is a lower alkyl group containing from one to four carbon atoms, and R' is a substituent in the 3-, 4- or 5-position selected from the group consisting of hydroxy, lower alkoxy, e. g. methoxy, ethoxy, propoxy or butoxy, halogen, e. g. chlorine or bromine, nitro, amino, lower alkylamino wherein said alkyl group is methyl, ethyl, propyl or butyl, and acylamino groups wherein the acyl group is the acid residue of acetic, propionic or butyric acid, for example. These alkoxime compounds exist in two isomeric forms and it is the alpha form, shown in the formula above, which is found to be most active.

The compounds of my invention may be readily obtained by reacting salicylaldehyde, substituted in the 3-, 4- or 5-position by any one of the aforementioned monovalent substituent groups with the desired alkxoyamine, as the hydrochloride, for example, employing a neutral organic solvent as the reaction medium. From one to four mols of the alkoxyamine are employed for each mol of the subbstituted aldehyde compound. Examples of suitable solvents which may be employed are ethyl alcohol, methyl alcohol, propyl alcohol, dioxane and pyridine. The reaction is usually complete on heating the reaction mixture under reflux for from a few seconds up to about 1.5 hours, or by allowing the reaction mixture to stand at room temperature for 12 hours or more. On reducing the volume of the reaction mixture by distilling off a portion of the solvent, followed by cooling, the alkoxime reaction product crystallizes out and may be separated by filtration. Recrystallization from an additional quantity of the reaction solvent is usually sufficient to yield the product in purified form.

Normally, the product is obtained as a mixture of the isomeric forms, the alpha form being the predominant one. Generally the alpha form is present in well over 90% of the product. The two forms exist in equilibrium and normally only a very minor proportion of the beta form is present so that a resolution of the isomers is not at all necessary. Where the beta form is desired, it may be obtained by irradiation of the alpha form or by saturating an anhydrous ether solution of the alpha form with hydrogen chloride.

In order further to illustrate my invention but without being limited thereto, the following examples are given.

Example I 3 parts by weight of 2,4-hydroxybenzaldehyde are dissolved in about 8 parts by weight of 95% aqueous ethyl alcohol and 6.4 parts by weight of methoxylamine hydrochloride and 18 parts by weight of sodium acetate are dissolved in 20 parts by weight of water. The separate solutions are mixed and heated under reflux for 1.5 hours. The reaction mixture is then cooled and a crystalline product separates out. The product is recrystallized after treatment with decolorizing charcoal from an aqueous mixture of 8 parts by weight of ethyl alcohol and 40 parts by weight of water. The product is further recrystallized from a mixture of 25 parts by weight of ethyl alcohol and 70 parts by weight of water. The initial crop of crystals is separated and a second crop is then obtained by permitting the mother liquor to stand for about 12 hours at refrigerator temperature. The initial crop of crystals are small needles. The second crop is a grainy crystalline form. The second crop comprises the alpha-isomeric form of 4-hydroxy-salicylaldehydemethoxime and melts at about 117–118° C. (uncorr.). The first crop is the beta isomeric form and melts at about 115° C. (uncorr.). On standing, a part of the latter isomer is converted to the alpha form. The different isomeric forms may be readily identified since only the alpha form will bind up copper when in the presence of a soluble copper salt such as copper acetate, to yield a characteristic colored precipitate.

Example II 1.5 parts by weight of p-methoxy-salicylaldehyde are dissolved in about 12 parts by weight of 95% ethyl alcohol and 2.5 parts by weight of methoxylamine hydrochloride and 8.2 parts by weight of sodium acetate are dissolved in 10 parts by weight of water. After the solutions are mixed together the reaction mixture thus obtained is heated under reflux for 1.5 hours. The mixture is then cooled and a crystalline product obtained. After recrystallization from a mixture of 12 parts by weight of 95% ethyl alcohol and 10 parts by weight of water, 1.5 parts by weight of a white grainy crystalline product is obtained comprising p-methoxy-salicylaldehyde methoxime, melting at 36–37° C. The yield obtained is 94% of theory.

Example III 1 part by weight of p-nitrosalicylaldehyde, 1.5 parts by weight of methoxylamine hydrochloride, and 4.9 parts by weight of sodium acetate are dissolved in a mixture of 28 parts by weight of 95% ethyl alcohol and 10 parts by weight of water. The reaction mixture formed is refluxed for one hour and a portion of the solvent distilled off sufficient to reduce the total volume by about one-third. The resulting reaction mixture is then cooled and a crystalline product formed. The crystalline material is filtered off, dried and then recrystallized from a mixture of about 16 parts by weight of ethyl alcohol and 5 parts by weight of water. The product obtained is p-nitro-salicylaldehyde-methoxime which forms faintly yellow crystals, melting at 150.5–151.5° C. Assay indicates the product to be about 96.6% alpha in form. Analysis for $C_8H_8O_4N_2$ is:

|  | Percent C | Percent H | Percent N |
|---|---|---|---|
| Calculated | 48.98 | 4.11 | 14.29 |
| Found | 49.09 | 4.13 | 14.45 |

*Example IV*

3 parts by weight of 5-nitro-salicylaldehyde are dissolved in a mixture of 80 parts by weight of 95% ethyl alcohol and 30 parts by weight of water. To this solution are added 4.5 parts by weight of methoxylamine hydrochloride and 15 parts by weight of sodium acetate. The solution obtained is refluxed for 1.5 hours on a steam bath. Upon cooling, a crystalline product is formed which is recrystallized from a mixture of 48 parts by weight of 95% ethyl alcohol and 5 parts by weight of water. A yield of 2.8 parts by weight of 5-nitro-salicylaldehyde methoxime is obtained melting at 154–155° C. (uncorr.). The product gives a positive analysis for the alpha isomeric form.

*Example V*

2 parts by weight of 5-chloro-salicylaldehyde are dissolved in 28 parts by weight of 95% ethyl alcohol and 3 parts by weight of methoxylamine hydrochloride and 10 parts by weight of sodium acetate are dissolved in 15 parts by weight of water. The separate solutions obtained are then mixed and refluxed for 1.5 hours on a steam bath. On cooling, a crystalline product is formed, then filtered off and recrystallized from a mixture of 20 parts by weight of 95% ethyl alcohol and 10 parts by weight of water. The yield of 2.15 parts by weight of 5-chloro-salicylaldehyde-methoxime was obtained melting at 64–65° C. The product gives a positive test for the alpha form. A nitrogen and halogen analysis is, for $C_8H_8O_2NCl$:

|  | Percent N | Percent Cl |
|---|---|---|
| Calculated | 7.55 | 19.11 |
| Found | 7.47 | 19.18 |

*Example VI*

8.4 parts by weight of stannous chloride are dissolved in 48 ml. of concentrated hydrochloric acid on a steam bath and 2 parts by weight of 5-nitro-salicylaldehyde are added. After heating and stirring for about 10 minutes, a complex of stannic chloride and 5-amino-salicylaldehyde precipitates. 4 parts by weight of methoxylamine hydrochloride are dissolved in 10 parts by weight of water and then heated on a steam bath. To the latter solution is then added a solution of 32 parts by weight of sodium hydroxide in 125 parts by weight of water while at the same time the hydrochloric acid solution of the stannic chloride complex of 5-amino-salicylaldehyde is also added. The latter is cooled to about 10° C. before being added to the hot methoxylamine hydrochloride solution. After the portionwise but simultaneous addition of the aqueous sodium hydroxide solution and the hydrochloric acid solution of the complex are completed, acetic acid is added until a pH of about 8.0 is reached. During the addition of acetic acid, stannic oxide precipitates. The reaction mixture is then heated and stirred for about 10 minutes and filtered while hot. The filtered precipitate is washed with a small amount of warm water. The filtrate is then saturated with sodium chloride, cooled, and the pH adjusted to 7.0. After the filtrate is cooled, it is maintained at a temperature between 0° C. and −10° C. until crystallization is complete. The crystalline product is separated and recrystallized from a mixture of ethyl alcohol and water. The product obtained is 5-amino-salicylaldehyde methoxime which forms faintly colored yellow to tan crystals, melting at 67–68° C.

*Example VII*

The product formed in accordance with the foregoing example may be converted to the corresponding acetylamino compound by reacting it with acetic anhydride. Thus, 0.1 part by weight of 5-amino-salicylaldehyde methoxime is added to about 1 part by weight of acetic anhydride, and the mixture warmed slightly to form a clear solution. The solution obtained is then immediately poured into ice water with stirring and a precipitate of 5-acetylamino-salicylaldehyde-methoxime is obtained. The product forms white crystals, melting at 159–160° C. Analysis for $C_{10}H_{12}O_3N_2$ is:

|  | Percent C | Percent H | Percent N |
|---|---|---|---|
| Calculated | 57.68 | 5.81 | 13.46 |
| Found | 57.59 | 5.93 | 13.48 |

*Example VIII*

0.15 part by weight of 4-dimethyl-amino-salicylaldehyde (M. P. 80° C.) is dissolved in 4 parts by weight of 95% ethyl alcohol mixed with 3 parts by weight of water. 0.45 part by weight of methoxylamine hydrochloride and 1.5 parts by weight of sodium acetate are dissolved in 3 parts by weight of water, and in separate solutions are mixed and refluxed for one hour. The crystalline product obtained on cooling the reaction mixture is recrystallized from aqueous ethyl alcohol. The 4-dimethylamino-salicylaldehyde methoxime melts at 46.5–47° C. Analysis for $C_{10}H_{14}O_2N_2$ is:

|  | Percent C | Percent H | Percent N |
|---|---|---|---|
| Calculated | 61.82 | 7.27 | 14.43 |
| Found | 61.88 | 7.29 | 14.54 |

*Example IX*

1.2 parts by weight of 3-chloro-salicylaldehyde are dissolved in 12 parts by weight of 95% ethyl alcohol, and 1.8 parts by weight of methoxylamine hydrochloride, and 6 parts by weight of sodium acetate are dissolved in 10 parts by weight of water. The solutions are combined and refluxed for 1.5 hours. The product obtained is recrystallized from aqueous ethyl alcohol. The 3-chloro-salicylaldehyde methoxime forms white lustrous plates, melting at 64–65° C. (uncorr.). This compound readily precipitates cupric ion. Analysis for $C_8H_8O_2NCl$ is:

|  | Percent N | Percent Cl |
|---|---|---|
| Calculated | 7.55 | 19.10 |
| Found | 7.37 | 19.04 |

*Example X*

2 parts by weight of recrystallized 3-methoxy-salicylaldehyde are dissolved in 16 parts by weight of ethyl alcohol, and this solution is combined with a solution of 3 parts by weight of methoxylamine hydrochloride and 9 parts by weight of sodium acetate in 10 parts by weight of water. The combined solutions are refluxed for 1.5 hours on a steam bath, and the product obtained is recrystallized from aqueous ethyl alcohol. A yield of 2 parts by weight of 3-methoxy-salicylaldehyde methoxime are obtained, the product crystallizing in the form of white needles that turn yellow in light and melting at 79–80° C. This compound precipitates cupric ion. Analysis for $C_9H_{11}O_3N$ is:

Percent N
Calculated _____ 7.73
Found _____ 7.67

Example XI 0.5 part by weight of 3-nitro-salicylaldehyde is dissolved in 4 parts by weight of 95% ethyl alcohol and combined with a solution of 0.8 parts by weight of methoxylamine hydrochloride and 2 parts by weight of sodium acetate dissolved in 3 parts by weight of water. The combined solutions are refluxed for 1.5 hours and the product formed is recrystallized from aqueous ethyl alcohol in the form of yellow needles. A yield of 0.5 parts by weight of 3-nitro-salicylaldehyde methoxime is obtained which melts at 124–125° C. (uncorr.). A heavy precipitate is obtained if the product is warmed with copper acetate and allowed to stand for about 30 minutes. The analysis for $C_8H_8O_4N_2$ is:

|  | Percent N |
|---|---|
| Calculated | 14.29 |
| Found | 14.29 |

Example XII

By following the procedure described in Example VI above, employing 3-nitro-salicylaldehyde, 3-amino-salicylaldehyde methoxime is obtained in the form of fine tan colored needles melting at 82.5–83.5° C. (uncorr.). This product gives a precipitate with copper acetate. Analysis for $C_8H_{10}O_2N_2$ is:

|  | Percent C | Percent H | Percent N |
|---|---|---|---|
| Calculated | 57.82 | 6.06 | 16.86 |
| Found | 57.89 | 6.12 | 16.92 |

Example XIII

Following the procedure given in Example VII, the product of Example XII may be converted to the corresponding acetyl derivatives. The 3 - acetamino - salicylaldehyde methoxime forms white needles melting at 117–118° C. (uncorr.). This compound gives a precipitate with copper acetate. Analysis for $C_{10}H_{12}O_3N_2$ is:

|  | Percent C | Percent H | Percent N |
|---|---|---|---|
| Calculated | 57.68 | 5.81 | 13.46 |
| Found | 57.50 | 5.80 | 13.44 |

Additional novel compounds of my invention which have been prepared following the foregoing procedures are:

|  | M. P. °C. |
|---|---|
| 5-methoxy-salicylaldehyde methoxime | 73.5–74.5 |
| 5-hydroxy-salicylaldehyde methoxime | 128–129 |
| 4-chloro-salicylaldehyde methoxime | 34–35 |
| 3-hydroxy-salicylaldehyde methoxime | 73.5–74.5 |
| 4-amino-salicylaldehyde methoxime | 72–73 |
| 4-acetylamino-salicylaldehyde methoxime | 209–210 |

The melting points given above are uncorrected.

It is understood that the foregoing detailed description is given merely by way of illustration and that many variations may be made therein without departing from the spirit of my invention.

Having described my invention, what I desire to secure by Letters Patent is:

1. The compounds of the following formula

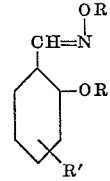

substituted by hydrogen in the 6-position, and wherein R is a lower alkyl group containing from one to 4 carbon atoms and R' is a member of the group consisting of hydroxy, lower alkoxy, chloro, bromo, nitro, amino, lower alkylamino and lower acylamino groups.

2. As a new product, 4-nitro-salicylaldehyde methoxime.

3. As a new product, 5-nitro-salicylaldehyde methoxime.

4. As a new product, 5-acetamino-salicylaldehyde methoxime.

5. As a new product, 4-amino-salicylaldehyde methoxime.

6. As a new product, 4-dimethylamino-salicylaldehyde methoxime.

7. Process for the production of novel alkoximes, which comprises reacting a salicylaldehyde mono substituted in but one of the 3-, 4- and 5-positions by a member of the group consisting of hydroxy, lower alkoxy, chloro, bromo, nitro, amino, lower alkylamino and lower acylamino groups with an alkoxylamine in an inert solvent medium.

8. Process for the production of novel alkoximes, which comprises reacting a salicylaldehyde mono substituted in but one of the 3-, 4- and 5-positions by a member of the group consisting of hydroxy, lower alkoxy, chloro, bromo, nitro, amino, lower alkylamino and lower acylamino groups with the hydrochloride of an alkoxylamine in an inert solvent medium.

No references cited.